United States Patent [19]

Paradowski

[11] Patent Number: 5,670,027
[45] Date of Patent: Sep. 23, 1997

[54] METHOD OF DRYING A GAS MAKING USE OF A DISTILLATION OF A LIQUID DESICCANT AGENT

[75] Inventor: Henri Paradowski, Cergy Pontoise, France

[73] Assignee: Technip, Courbevoie, France

[21] Appl. No.: 543,456

[22] Filed: Oct. 16, 1995

[30] Foreign Application Priority Data

Oct. 24, 1994 [FR] France .................. 94 12687

[51] Int. Cl.[6] .................. B01D 3/00; C07C 29/80
[52] U.S. Cl. .................. 203/18; 203/22; 203/23; 203/49; 203/DIG. 8; 159/4; 159/29; 202/176; 202/179; 202/235
[58] Field of Search .................. 203/18, 22, 23, 203/49, DIG. 8; 159/4, 29; 202/176, 179, 235

[56] References Cited

U.S. PATENT DOCUMENTS

| | | | |
|---|---|---|---|
| 2,758,665 | 8/1956 | Francis, Jr. .................. | 203/18 |
| 3,105,748 | 10/1963 | Stahl .................. | 203/18 |
| 3,233,390 | 2/1966 | Meyers .................. | 203/18 |
| 3,925,047 | 12/1975 | Harper .................. | 62/20 |
| 4,009,083 | 2/1977 | Lyon et al. .................. | 203/49 |
| 4,010,065 | 3/1977 | Alleman .................. | 159/4 |
| 4,314,891 | 2/1982 | Knobel .................. | 203/18 |
| 4,460,383 | 7/1984 | Valerius .................. | 55/32 |
| 4,714,487 | 12/1987 | Rowles .................. | 62/24 |
| 4,775,395 | 10/1988 | Rojey et al. .................. | 55/27 |
| 4,978,430 | 12/1990 | Nakagawa et al. .................. | 203/14 |
| 4,979,966 | 12/1990 | Rojey et al. .................. | 55/32 |
| 5,234,552 | 8/1993 | McGrew et al. .................. | 203/18 |
| 5,501,776 | 3/1996 | Lermite et al. .................. | 203/18 |

FOREIGN PATENT DOCUMENTS 0 362 023 A1  4/1990  European Pat. Off.

*Primary Examiner*—Nina Bhat
*Attorney, Agent, or Firm*—Pennie & Edmonds LLP

[57] ABSTRACT

A method of drying a gas making use of the distillation of a liquid desiccant, the method comprising the introduction of a stream of make-up liquid containing water and of an organic solvent miscible with water, the solvent being a more volatile solvent than water under the conditions of the method and forming no azeotropes with water, in an intermediate zone of an elongated vertical contact and fractional distillation zone.

14 Claims, 3 Drawing Sheets

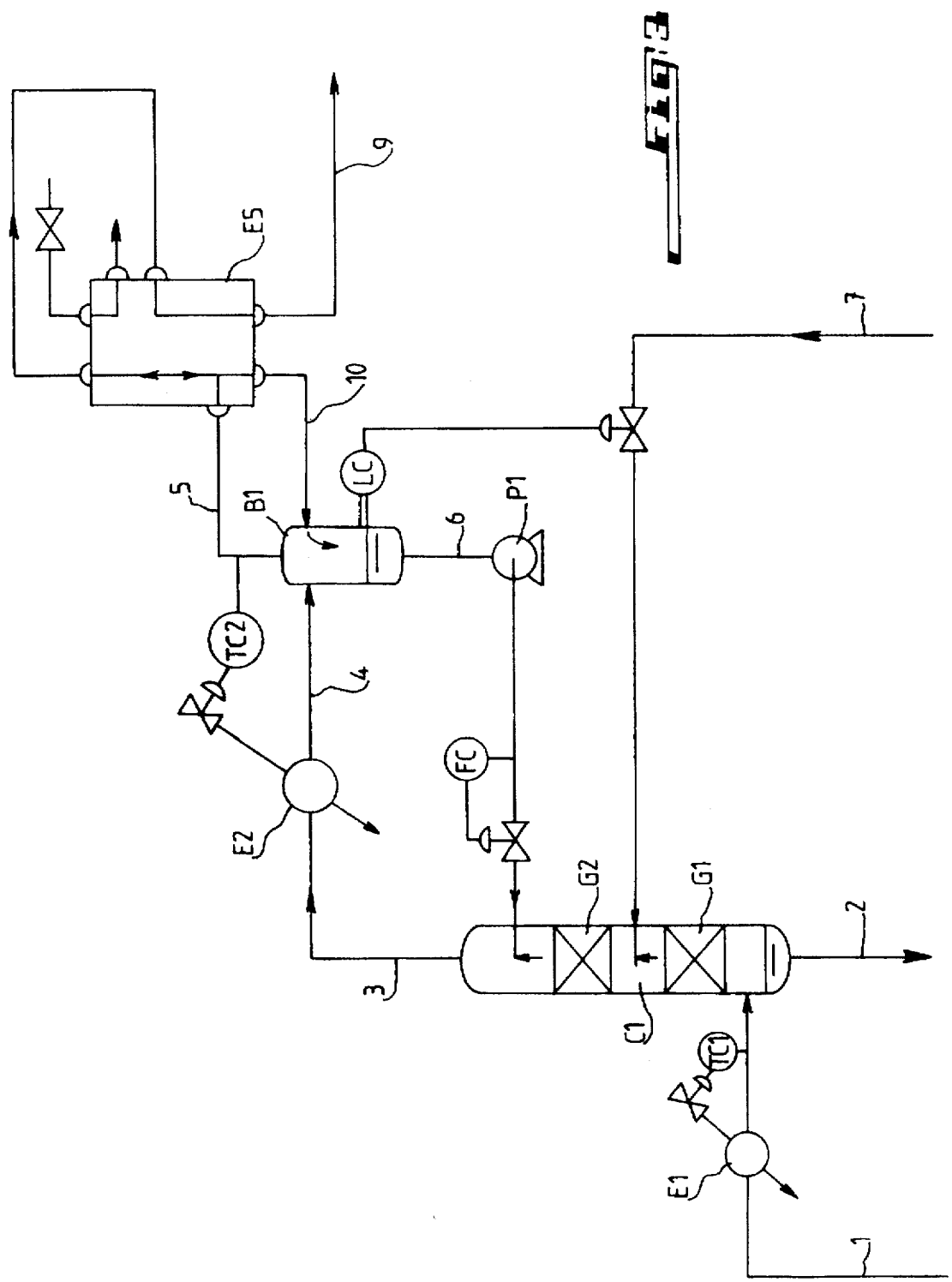

METHOD OF DRYING A GAS MAKING USE OF A DISTILLATION OF A LIQUID DESICCANT AGENT

BACKGROUND OF THE INVENTION

The subject of the present invention is to allow a simple and economic treatment of a gas preferably a gas under high pressure containing significant amounts of water in order to produce:

- a dry gas the water content of which is for example lower than 10 ppm mole and which may therefore be cooled down to a low temperature without having to fear the formation of hydrates or of ice; the water content to be reached for the dry gas is selected in accordance with the temperatures to be reached in the treatment or the subsequent uses of the said gas;
- water which may be discharged towards a biological treatment or rejected directly and the content of contaminants of which is small.

This method favorably compares with the known techniques currently used which are:

- the drying through adsorption of water onto a solid desiccant such as the molecular sieves, the silica gel or the activated alumina,
- the drying through absorption of water in a liquid desiccant the volatility of which is small at room temperature such as the TEG (triethylene glycol).

It allows to obtain water contents of the treated gases much lower than those obtained in the refrigeration processes and the use of a solvent which would inhibit the formation of ice and of hydrates, by solubilizing the water and therefore reducing its fugacity.

There is for example known (U.S. Pat. No. 4,775,395) a method of drying gas wherein (a) the gas is contacted with a liquid phase formed of water and of a water-soluble solvent such as methanol, ethanol, pyridine or piperidine, (b) a liquid aqueous phase is discharged, (c) the gas which carries along solvent vapors and steam is recovered, (d) the gas is cooled down to condense the solvent and the water and (e) the gas separated from the condensed solvent and water which are returned to the step (a) is collected. The solvent may be more volatile or less volatile than water and the use of solvents forming azeotropes with water is recommended. A make-up of aqueous solvent is effected in the gas collected in the step (c) prior to the cooling and condensing in step (d). This make-up is intended to compensate for the losses of solvent due to its vapor being carried away in the gas collected in the step (e) and in the aqueous phase discharged in the step (b). In spite of the use of very low temperatures during the said cooling, the water content of the gas recovered in step (e) remains high.

SUMMARY OF THE INVENTION

The method of the invention is defined as follows:

Method of drying a moist gas comprising the following steps:

a. introduction of a stream of the said moist gas to be dried at the base of an elongated vertical contact and fractional distillation zone and contacting in counter-current relationship in the said zone an upward flowing stream of the said moist gas with a downward flowing stream of liquid containing water and an organic solvent miscible with water under conditions of fractional distillation of the components of the downward flowing stream of liquid, b. discharge at the bottom of the contact and fractional distillation zone of a stream of liquid enriched with water and having become lean in the said organic solvent, c. discharge at the head of the contact and fractional distillation zone of a stream of dried gas enriched with the vapor of the said organic solvent, d. cooling down of the stream of dried gas of the step (c) to condense a liquid phase and separation of the said liquid phase from the said dried gas, e. returning the condensed phase separated from the dried gas in step (d) to the head of the contact zone of the step (a) to constitute at least one part of the said downward flowing stream of liquid, and f. providing the method with a stream of make-up liquid containing water and the said organic solvent, the latter in an amount at least equal to that of the organic solvent lost in the discharged streams of the dried gas of the step (d) and of the bottom liquid of the step (b), the method being characterized in that it consists in introducing the stream of make-up liquid into an intermediate zone of the elongated vertical contact and fractional distillation zone of the step (a), the said intermediate zone separating the said contact and fractional distillation zone into a first contact and fractional distillation zone located in the lower part of the contact zone of the step (a) between the zone of introduction of the stream of moist gas and the said intermediate zone and a second contact and fractional distillation zone located in the upper part of the contact zone of the step (a) between the said intermediate zone and the zone of returning to the step (a) of the condensed liquid phase of the step (e), the organic solvent miscible with water being a more volatile solvent than water under the conditions of the method and which forms no azeotrope with water.

The organic solvent of the make-up liquid stream which acts as a desiccant may for example be methanol, acetone, a mixture of methanol and of acetone among others but methanol is preferred for the method. The water content of this make-up liquid may vary between very broad limits; there may for example be used for the make-up liquid a mixture in moles of 0.01 to 90 parts of water for 99.99 to 10 parts of (anhydrous calculated solvent). Mixtures of 10 to 70 parts of water for 90 to 30 parts of methanol in moles constitute a practical example. It is thus possible to use methanol diluted in water, less expensive than the perfectly anhydrous methanol. The industrially available methanol has a water content usually of about 0.2% by mole. The aqueous solutions of methanol originating from the recovery of methanol through washing with water of cuts of hydrocarbons have water contents lying between 50 and 80% by mole.

The composition of the condensed phase returned to the step (a) is that which results from the operating conditions. In a general manner it is a stream of the same organic solvent as the one introduced into the make-up stream but its water content is lower than that of the make-up stream. This water content would condition to some extent the water content of the dried gas. It is for example lying between 20 and 10,000 parts per mole of water per each million parts by mole of the condensed phase and preferably between 50 and 2,000 parts per mole of water per each million parts by mole of the condensed phase. It is conditioned among others by the effectiveness of the contact and fractional distillation zone. The latter advantageously contains at least 2 (preferably less than 5) theoretical trays or plates in its lower portion (below the zone of make-up with desiccant) and at least 2 (preferably at least 5) theoretical trays or plates in its upper portion (above the said make-up zone).

The aqueous make-up stream is among others useful to compensate for the losses of organic solvent in particular those resulting from the vapors of the said solvent being carried away in the obtained dried gas and from the solvent being carried away in the stream of liquid discharged in step (b), the said stream consisting essentially of water and of traces of solvent. The amount of aqueous make-up stream should therefore be at least the one required to compensate for the said losses of organic solvent. The loss of methanol vaporized in the dried gas will be so much the lower as the condensation temperature in the step (d) is selected to be lower. The following examples give the values for different condensation temperatures.

The temperature and the pressure during the contacting operation in the step (a) should be selected in such a manner that the contact zone may operate as fractional distillation zones permitting to recover at the head a vapor effluent rich in organic solvent and at the bottom a liquid effluent rich in water.

In a preferred embodiment one operates in an elongated vertical distillation zone, the stream of gas being admitted into the lower portion of the said zone and flowing in the upward direction through a contact zone fed at the head by the condensed liquid phase and in an intermediate fashion with a liquid make-up stream.

To obtain high treatment flow rates and avoid the use of excessively low temperatures during the condensation in the step (d), one should advantageously operate under a super-atmospheric pressure, for example an absolute pressure of 2 to 50 bars or more. In the contact zones and at their base the temperature will be higher than that which would result in the formation of ice or of solid hydrates.

The cooling and the condensing in the step (d) may make use of a refrigerating zone followed by a drum for the separation between the gas and the condensate. One may also use a dephlegmator which economically performs both functions.

In a particular embodiment with the purpose of further reducing the amount of desiccating organic solvent carried along by the obtained dried gas, one may further cool the said dried gas obtained in the step (d) to produce a diphasic stream which is then separated to produce dry purified gas and a stream of recovered liquid desiccating solvent which may be recycled in the method for example through return to the step (a) in the stream of condensed liquid phase. Not only the content of solvent carried away in the gas is lowered but one may further reduce the water content of the said gas.

As an alternative embodiment the purification through additional cooling recited hereinabove may be used in a dephlegmator.

The gases which may be dried by the present method may be very variable in nature. It only is preferable that they do not react with the organic solvent and do not become dissolved in excessive amounts in water. By way of examples may be cited nitrogen, hydrogen and the gaseous or vaporized for example C1 to C6-hydrocarbons provided that they be more volatile than water under the operating condition and form no azeotrope therewith.

With a moist gas is meant a gas which contains significant amounts of water in the state of steam going for instance from 5 ppm in mole up to saturation which depends on the temperature and the pressure.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non-limiting examples only illustrating several embodiments of the invention and in which:

FIG. 3 illustrates the embodiment of FIG. 2 in which the additional drying and purifying are carried out in a dephlegmator.

DETAILED DESCRIPTION OF THE INVENTION

Figure 1:
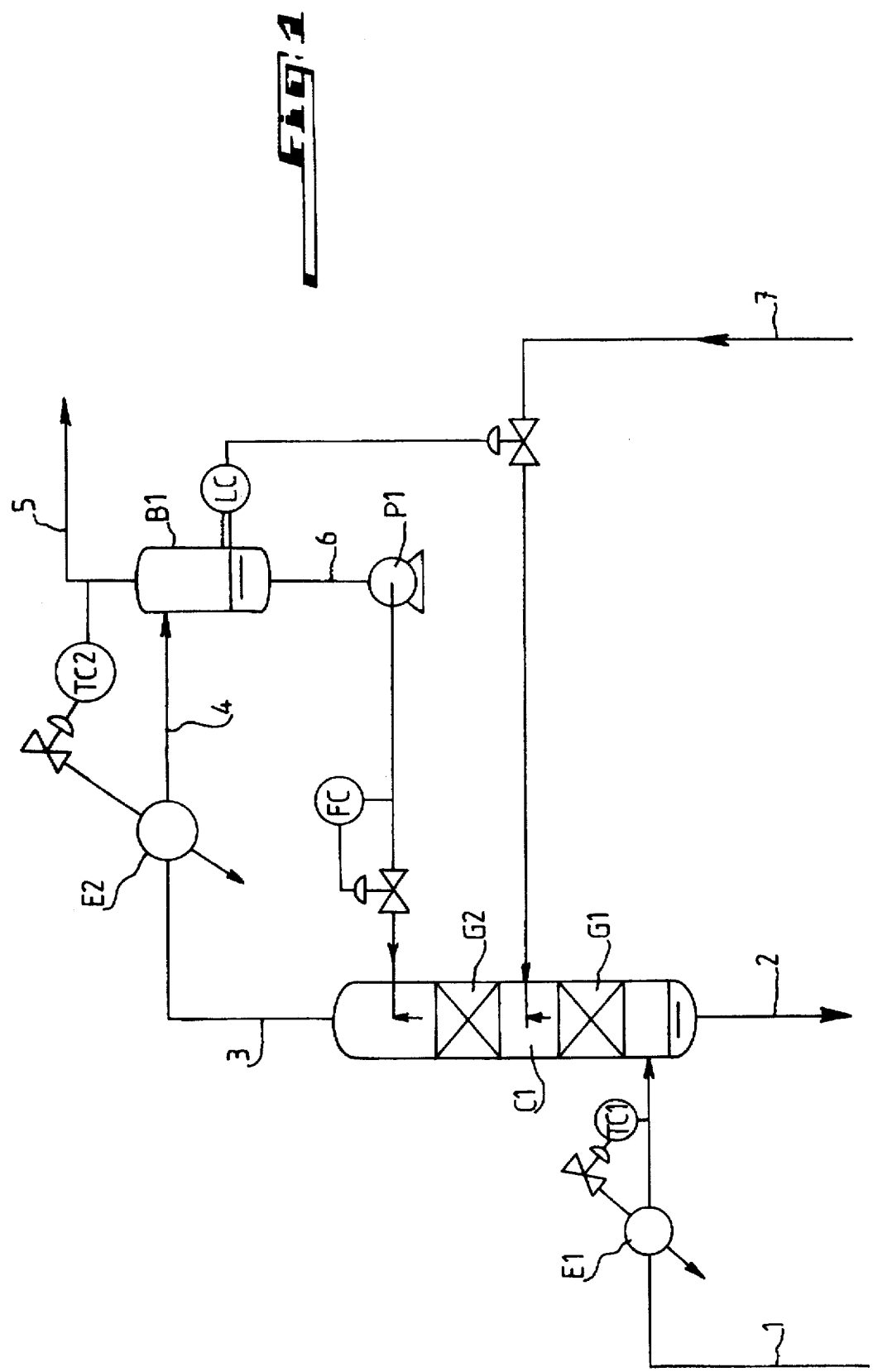
FIG. 1 shows a simplified embodiment of the method.

As it is seen on FIG. 1 the moist gas reaches through the line (with line is meant a pipeline) 1 the column C1 while flowing if need be through an exchanger E1 which controls and adjusts the temperature thereof through the medium of a temperature controller TC1. The column encloses plates or a packing. Two packings G1 and G2 have been shown.

The head vapor effluent (line 3) is cooled in the exchanger E2 adjusted in temperature by the controller TC2. The now diphasic effluent is returned through the line 4 to the separating drum B1. The dried gas is discharged through the line 5.

The condensate is returned by the line 6 and the pump P1 to the top of the column C1. Its flow rate may be controlled by the controller FC. The make-up of organic solvent is provided by the line 7 which opens into the column C1 at an intermediate point so that a number of counter-current contact decks or plates are provided between this intermediate point and the point of intake of the condensate stream of the line 6 on the one hand and between this intermediate point and the point of intake of the moist gas of the line 1 on the other hand. The flow rate of the line 7 may be interlocked in follow-up relationship with the level of condensate in B1 via the controller LC.

At the bottom of the column C1 is collected or recovered water rejected by the line 2 and which may contain traces of organic solvent, preferably less than 100 ppm and still better less than 10 ppm mole.

Figure 2:
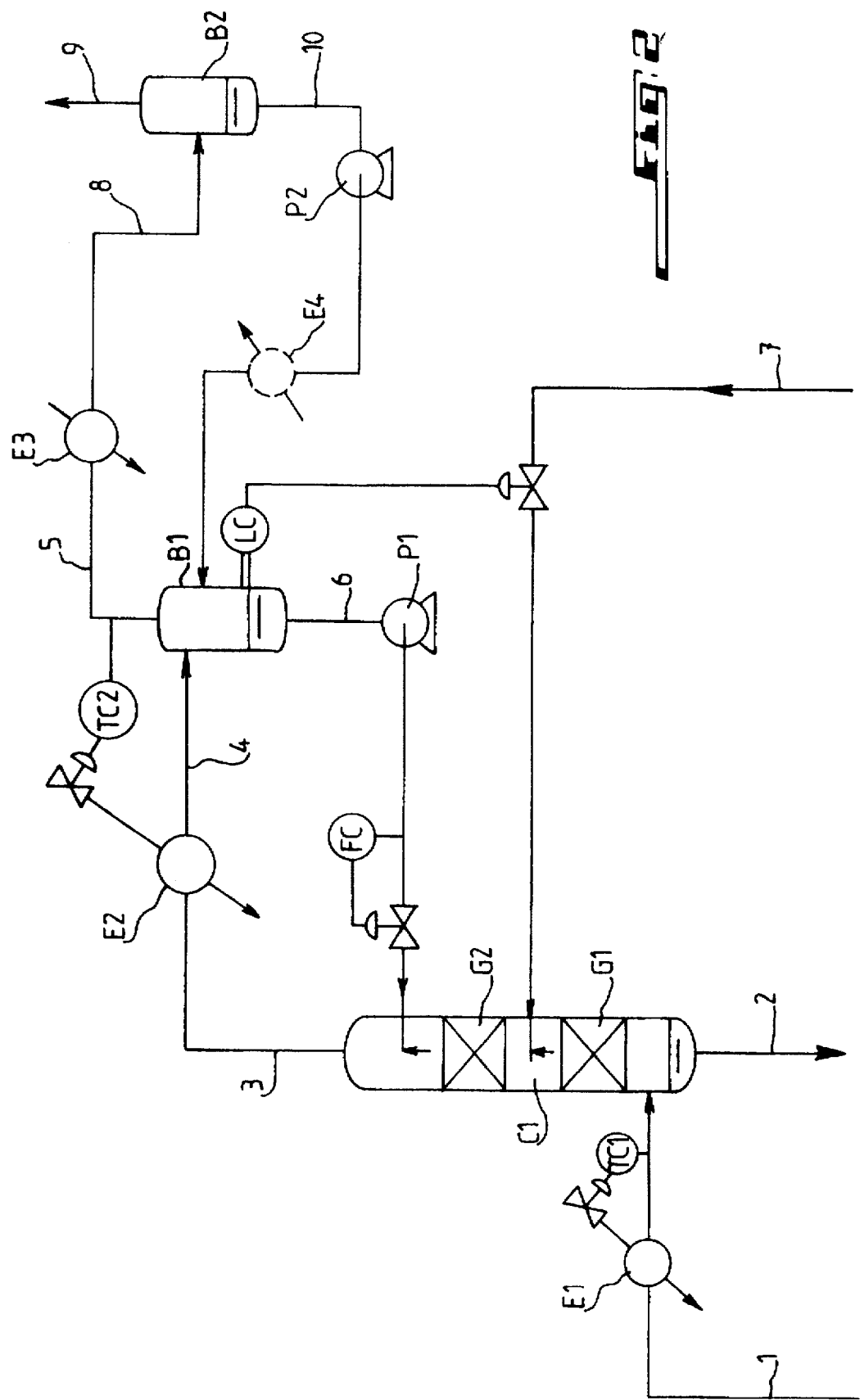
FIG. 2 illustrates an embodiment comprising an additional drying and purifying step.

In the embodiment illustrated on FIG. 2, the dried gas is cooled down further in the exchanger E3 and the formed condensate is carried through the line 8 to the decanting or settling drum B2. The purified gas the organic solvent content and possibly the water content of which have been lowered, is collected or recovered by the line 9 whereas the line 10 allows to return the condensate via the pump P2 and the exchanger E4 to the drum B1. The controller TC2 may be interlocked here in follow-up relationship with the pipeline 5.

In the embodiment shown on FIG. 3, the exchangers E3 and E4 and the drum B2 are replaced by the dephlegmator E5 the operation of conventional type of which needs not be described in detail.

EXAMPLES

The following non-limiting examples are illustrating the invention.

Example 1

Drying of Nitrogen

Different nitrogen drying tests have been run by using methanol as the desiccating organic solvent which forms no azeotrope with water. Nitrogen is available under an absolute pressure of 12.5 bars at a temperature of 50° C. but as cases might be its temperature is raised or lowered in the exchanger E1 to adapt itself to the temperatures of the column C1 shown in Table 1. Nitrogen contains 9,298 ppm in mole of water and is supplied at the rate of 1,250 kmoles/h.

The make-up desiccant (line 7) is a 50%/mole mixture of water and of methanol.

The column has 20 theoretical plates or decks in the drying zone (G2) and 10 theoretical plates or decks in the exhausting or depleting zone (G1).

The experimental conditions and the results of these tests are gathered in Table 1 from which it appears that the performances of the method are improved when the condensation temperature decreases:

the methanol content of the dried gas decreases and reaches about 3,000 ppm mole when the temperature is –5° C. in the drum B1, the desiccant make-up flow rate decreases in the same proportions, the heat exchanged by the exchanger E2 decreases, when the temperature of B1 is lower than 20° C., it is no longer necessary to heat the gas in the exchanger E1, the reflux flow rate of the column C1 (line 6) decreases.

The optimum conditions are obtained with a temperature of B1 as low as possible taking into account the available coolant. Temperatures below –5° C. may be used for example down to –50° C. in the drum B1. The temperature at the bottom of the column C1 should however be higher than the temperature of formation of ice or of hydrates.

Example 2

Drying of Ethane

One has operated substantially as in the case AZ1-1 described in Table 1 under an absolute pressure of 12.5 bars with ethane containing 9,298 ppm in mole of water. One has observed a head temperature of 56° C. and a bottom temperature of 78° C. in the column C1. The obtained dry ethane (line 5) had a methanol content of 28,059 ppm in mole and a water content of 1 ppm in mole.

If one operates under 25 bars, the methanol and water contents of the dry ethane are 18,098 ppm and 1 ppm in mole, respectively, thereby showing that it is advantageous to operate under a high pressure.

If a make-up desiccant is used which contains 40% in mole of water instead of 50%, it is found that the same composition for the dry ethane may be obtained and this with a reduced heat energy consumption and with smaller reflux and make-up flow rates.

Example 3

Drying of a Gaseous Mixture 5 tests of drying a gaseous mixture the hexane content of which has been varied, have been carried out by using the method in its basic version such as shown on FIG. 1.

The gas to be dried consists of a mixture of methane and of n-hexane available at a temperature of 50° C. and at an absolute pressure of 40 bars. This gas contains 3,045 ppm mole of water. The desiccant used is methanol.

The gas is dried by distillation in a plant or equipment where the column C1 is fitted with two packing beds. The drying packing (G2) comprises 7 theoretical plates or decks and the packing for the removal of the desiccant (G1) comprises 8 theoretical plates or decks.

Different cases gathered in Table 2 have been studied with hexane contents of the gaseous mixture ranging from about 0.1 to 0.5%. The cooling temperature in the exchanger E2 is 10° C. In all the cases the water content of the dry gas is 1 ppm mole and the methanol content of the rejected water is 1 ppm mole also.

The results are also shown on Table 2.

It is found that a greater flow rate of desiccant is necessary when the hexane content of the gaseous mixture increases since hexane by solubilizing itself in the desiccant reduces its effectiveness.

Example 4

Drying of Nitrogen with Additional Purifying of a Dry Gas Obtained

Nitrogen drying tests have been run by using the method in an improved version such as shown on FIG. 2 and by varying the number of theoretical plates or decks of the drying packing (G2) of the column C1. The gas to be dried consists of nitrogen available at an absolute pressure of 10.5 bars and 50° C. and saturated with water. The desiccant used is methanol.

The gas is dried by distillation in a plant or equipment where the column C1 is fitted with two packing beds. The drying packing (G2) comprises from 3 to 20 theoretical plates or decks and the packing for the removal of the desiccant (G1) comprises 10 theoretical plates or decks.

The cooling temperature in the exchanger E2 is 10° C. In all the cases the methanol content of the rejected water is 1 ppm mole.

The experimental conditions and the results of these tests are shown on Table 3. The additional dry gas purifying step allows to obtain significant improvements of the method:

the methanol content of the purified gas is reduced from 7,300 to 350 ppm mole, the water content of the purified gas is smaller than that of the dry gas, the distillation column requires less theoretical transfer plates or decks.

TABLE 1

| CASE | | AZ1-1 | AZ1-2 | AZ1-3 | AZ1-4 |
|---|---|---|---|---|---|
| Dry gas (line 5) | | | | | |
| Water content | ppm mole | 1 | 1 | 1 | 1 |
| Methanol content | ppm mole | 25,765 | 20,370 | 16,011 | 12,440 |
| Methanol content | kmol/h | 32.75 | 25.75 | 20.15 | 15.60 |
| Temperature (B1) | °C. | 35 | 30 | 25 | 20 |
| Rejected water (line 2) | | | | | |
| Temperature | °C. | 82.5 | 72.1 | 62.46 | 53.51 |
| Flow rate | kmol/h | 44.371 | 37.384 | 31.781 | 27.229 |
| Methanol content | ppm mole | 1 | 1 | 1 | 1 |
| Make-up desiccant (line 7) | | | | | |
| Total flow rate | kmol/h | 65.5 | 51.5 | 40.3 | 31.2 |
| Make-up methanol flow rate | kmol/h | 32.75 | 25.75 | 20.15 | 15.60 |
| Column C1 | | | | | |
| Head temperature | °C. | 55.5 | 48.34 | 41.85 | 35.9 |
| Bottom temperature | °C. | 82.5 | 72.1 | 62.46 | 53.51 |
| Exchanger E2 | | | | | |
| Outlet temperature | °C. | 35 | 30 | 25 | 20 |

TABLE 1-continued

Pump P1

| | | | | | |
|---|---|---|---|---|---|
| Desiccant flow rate (line 6) | kmol/h | 48.74 | 34.09 | 24.70 | 18.52 |
| Water content of desiccant | ppm mole | 115 | 151 | 200 | 267 |

| CASE | | AZ1-5 | AZ1-6 | AZ1-7 | AZ1-8 | AZ1-9 |
|---|---|---|---|---|---|---|
| Dry gas (line 5) | | | | | | |
| Water content | ppm mole | 1 | 1 | 1 | 1 | 1 |
| Methanol content | ppm mole | 9,597 | 7,303 | 5,505 | 4,101 | 3,015 |
| Methanol content | kmol/h | 12 | 9.11 | 6.855 | 5.1 | 3.745 |
| Temperature (B1) | °C. | 15 | 10 | 5 | 0 | −5 |
| Rejected water (line 2) | | | | | | |
| Temperature | °C. | 45.3 | 37.3 | 29.56 | 21.98 | 14.56 |
| Flow rate | kmol/h | 23.628 | 20.737 | 18.481 | 16.725 | 16.725 |
| Methanol content | ppm mole | 1 | 1 | 1 | 1 | 1 |
| Make-up desiccant (line 7) | | | | | | |
| Total flow rate | kmol/h | 24 | 18.22 | 13.71 | 10.2 | 7.45 |
| Make-up methanol flow rate | kmol/h | 12 | 9.11 | 6.855 | 5.1 | 3.745 |
| Column C1 | | | | | | |
| Head temperature | °C. | 30.43 | 25.02 | 19.65 | 14.21 | 8.64 |
| Bottom temperature | °C. | 45.3 | 37.3 | 29.56 | 21.98 | 14.56 |
| Exchanger E2 | | | | | | |
| Outlet temperature | °C. | 15 | 10 | 5 | 0 | −5 |
| Pump P1 | | | | | | |
| Desiccant flow rate (line 6) | kmol/h | 14.31 | 11.05 | 8.46 | 6.38 | 4.69 |
| Water content of desiccant | ppm mole | 360 | 491 | 677 | 943 | 1,332 |

TABLE 2

| CASE | | MG1-1 | MG1-2 | MG1-3 | MG1-4 | MG1-5 |
|---|---|---|---|---|---|---|
| Gas to be dried (line 1) | | | | | | |
| Temperature | °C. | 50 | 50 | 50 | 50 | 50 |
| Absolute pressure | bar | 40 | 40 | 40 | 40 | 40 |
| Methane content | % mole | 99.5958 | 99.4961 | 99.3964 | 99.2967 | 99.1970 |
| Hexane content | % mole | 0.0997 | 0.1994 | 0.2991 | 0.3988 | 0.4985 |
| Water content | % mole | 0.3045 | 0.3045 | 0.3045 | 0.3045 | 0.3045 |
| Flow rate | kmol/h | 12.50 | 12.50 | 12.50 | 12.50 | 12.50 |
| Dried gas (line 5) | | | | | | |
| Water content | ppm mole | 1 | 1 | 1 | 1 | 1 |
| Methanol content | % mole | 0.3558 | 0.3533 | 0.3515 | 0.3500 | 0.3494 |
| Methanol content | kmol/h | 4.45 | 4.418 | 4.396 | 4.377 | 4.37 |
| Temperature | °C. | 10 | 10 | 10 | 10 | 10 |
| Absolute pressure | bar | 40 | 40 | 40 | 40 | 40 |
| Rejected water (line 2) | | | | | | |
| Temperature | °C. | 40.87 | 41.34 | 42.44 | 44.61 | 49.59 |
| Flow rate | kmol/h | 8.267 | 8.235 | 8.213 | 8.194 | 8.186 |
| Methanol content | ppm mole | 1 | 1 | 1 | 1 | 1 |
| Make-up desiccant (line 7) | | | | | | |
| Water content | % mole | 50 | 50 | 50 | 50 | 50 |
| Total flow rate | kmol/h | 8.9 | 8.836 | 8.792 | 8.754 | 8.74 |
| Make-up methanol flow rate | kmol/h | 4.45 | 4.418 | 4.396 | 4.377 | 4.37 |
| Column C1 | | | | | | |
| Heat temperature | °C. | 33.79 | 34.13 | 34.92 | 36.47 | 39.89 |
| Bottom temperature | °C. | 40.87 | 41.34 | 42.44 | 44.61 | 49.59 |
| Exchanger E2 | | | | | | |
| Outlet temperature | °C. | 10 | 10 | 10 | 10 | 10 |
| Pump P1 | | | | | | |
| Desiccant flow rate | kmol/h | 9.34 | 9.73 | 10.46 | 11.88 | 15.30 |
| Hexane content of the desiccant | % mole | 1.64 | 3.59 | 6.01 | 9.25 | 14.35 |
| Water content of the desiccant | ppm mole | 1,408 | 1,222 | 1,022 | 804 | 551 |

TABLE 3

| CASE | | AZ1-6 | AZ2-1 | AZ2-2 |
|---|---|---|---|---|
| Gas to be dried (line 1) | | Nitrogen | Nitrogen | Nitrogen |
| Temperature | °C. | 50 | 50 | 50 |
| Absolute pressure | bar | 12.5 | 12.5 | 12.5 |
| Water content | ppm mole | 9,298 | 9,298 | 9,298 |
| Flow rate | kmol/h | 1,250 | 1,250 | 1,250 |
| Dry gas (line 5) | | | | |
| Water content | ppm mole | 1 | 0.6 | 3 |
| Methanol content | ppm mole | 7,303 | 7,306 | 7,306 |
| Methanol content | kmol/h | 9.11 | 9.114 | 9.114 |
| Temperature (B1) | °C. | 10 | 10 | 10 |
| Absolute pressure | bar | 12.5 | 12.5 | 12.5 |
| Purified dry gas (line 9) | | | | |
| Water content | ppm mole | 1 | 0.01 | 0.06 |
| Methanol content | ppm mole | 7,303 | 351 | 351 |
| Methanol content | kmol/h | 9.11 | 0.435 | 0.435 |
| Temperature | °C. | 10 | −35 | −35 |
| Absolute pressure | bar | 12.5 | 12.5 | 12.5 |
| Rejected water (line 2) | | | | |
| Temperature | °C. | 37.3 | 35 | 35 |
| Flow rate | kmol/h | 20.737 | 12.061 | 12.064 |
| Methanol content | ppm mole | 1 | 1 | 1 |
| Make-up desiccant (line 7) | | | | |
| Water content | % mole | 50 | 50 | 50 a |
| Total flow rate | kmol/h | 18.22 | 0.87 | 0.876 |
| Make-up methanol flow rate | kmol/h | 9.11 | 0.435 | 0.438 |
| Column C1 | | | | |
| Drying zone (G2): Number of theoretical plates or decks | | 20 | 5 | 3 |
| Head temperature | °C. | 25.02 | 22.91 | 22.94 |
| Desiccant removal zone (G1): Number of theoretical plates or decks | | 10 | 10 | 10 |
| Bottom temperature | °C. | 37.3 | 35 | 35 |
| Exchanger E2 | | | | |
| Outlet temperature | °C. | 10 | 10 | 10 |
| Pump P1 | | | | |
| Flow rate of desiccant | kmol/h | 11.05 | 17.72 | 17.69 |
| Water content of desiccant | ppm mole | 491 | 169 | 1,175 |

What is claimed is:

1. A process for drying a moist gas comprising the steps of:
   a. feeding a stream of moist gas to be dried at the bottom of an elongated vertical contact and fractional distillation zone, feeding a first stream of liquid containing water and an organic solvent miscible with water to the top of said elongated vertical contact and fractional distillation zone, said organic solvent being more volatile than water under the process conditions but not forming an azeotrope with water, and contacting in counter-current relationship in the said zone an upward flowing stream of said moist gas with a downward flow of said first stream of liquid containing water and an organic solvent miscible with water under fractional distillation conditions of the components of the downward flowing stream of liquid;
   b. discharging at the bottom of the contact and fractional distillation zone a stream of liquid enriched with water and having become lean in the said organic solvent;
   c. discharging at the head of the contact and fractional distillation zone a stream of dried gas-enriched with vapor of the said organic solvent;
   d. cooling the stream of dried gas of the step (c) to condense a liquid phase and separating said condensed liquid phase from the said dried gas;
   e. returning the condensed liquid phase to the top of the contact zone of the step (a) as said first stream of liquid; and
   f. feeding a second stream of liquid containing water and organic solvent into an intermediate zone of the elongated vertical contact and fractional distillation zone, of the step (a), the said intermediate zone separating the said contact and fractional distillation zone into a first contact and fractional distillation zone located in the lower portion of the contact zone of the step (a) between the zone of introduction of the stream of moist gas and the intermediate zone a second contact and fractional distillation zone located in the upper portion of the contact zone of the step (a) between the said intermediate zone and the top of the contact zone of step (a), the organic solvent in said second stream being defined as in step (a) and being present in an amount at least equal to that of the organic solvent lost in the discharged streams of the dried gas of the step (d) and of the bottom liquid of the step (b).

2. A process according to claim 1, wherein the organic solvent is methanol.

3. A process according to claim 1, wherein the second stream of liquid contains from 0.01 to 90 parts by mole of water and from 99.99 to 10 parts by mole of the organic solvent.

4. A process according to claim 1, wherein the second stream of liquid contains 10 to 70 parts by mole of water and from 90 to 30 parts by mole of the organic solvent.

5. A process according to claim 1, wherein each one of the first and second contact and fractional distillation zones has an effectiveness corresponding to at least 2 theoretical plates.

6. A process according to claim 1, wherein each one of the first and second contact and fractional distillation zones has an effectiveness corresponding to at least 5 theoretical plates.

7. A process according to claim 1, wherein the condensed phase returned to the top of the contact zone of the step (a) contains from 50 to 2,000 parts per mole of water per each million parts by mole of the condensed phase, the remainder consisting of said organic solvent.

8. The process of claim 7, wherein the second stream of liquid contains 10 to 70 parts by mole of water and from 90 to 30 parts by mole of the organic solvent, and the condensed phase has a lower water content than the second stream of liquid.

9. A process according to claim 1, wherein the moist gas to be dried consists of at least one C1 to C6 hydrocarbon.

10. A process according to claim 1, wherein the stream of liquid discharged in step (b) has an organic solvent content lower than 100 ppm per mole of water.

11. A process according to claim 1, wherein the stream of liquid discharged in step (b) has an organic solvent content lower than 10 ppm per mole of water.

12. A process according to claim 1, wherein the condensed phase returned to the top of the contact zone of the step (a) contains from 20 to 10,000 parts per mole of water per each million parts by mole of the condensed phase, the remainder consisting of said organic solvent.

13. The process of claim 12, wherein the second stream of liquid contains from 0.01 to 90 parts by mole of water and from 99.99 to 10 parts by mole of the organic solvent, and the condensed phase has a lower water content than the second stream of liquid.

14. The process of claim 1, wherein the process is conducted under a pressure of from 2 to 50 bars absolute.

* * * * *